US011271943B2

(12) United States Patent
Urabe et al.

(10) Patent No.: US 11,271,943 B2
(45) Date of Patent: Mar. 8, 2022

(54) TERMINAL AUTHENTICATION DEVICE, TERMINAL AUTHENTICATION SYSTEM, AND TERMINAL AUTHENTICATION METHOD

(71) Applicant: RENESAS ELECTRONICS CORPORATION, Tokyo (JP)

(72) Inventors: Fumio Urabe, Tokyo (JP); Hiroki Sugimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 437 days.

(21) Appl. No.: 16/444,913

(22) Filed: Jun. 18, 2019

(65) Prior Publication Data

US 2019/0394209 A1 Dec. 26, 2019

(30) Foreign Application Priority Data

Jun. 25, 2018 (JP) .............................. JP2018-119876

(51) Int. Cl.
*H04W 76/10* (2018.01)
*H04L 29/06* (2006.01)
*H04W 12/08* (2021.01)
*H04W 12/06* (2021.01)
*H04W 84/18* (2009.01)

(52) U.S. Cl.
CPC .......... *H04L 63/107* (2013.01); *H04W 12/06* (2013.01); *H04W 12/08* (2013.01); *H04W 76/10* (2018.02); *H04W 84/18* (2013.01)

(58) Field of Classification Search
CPC ..................................................... H04L 63/107
USPC ............................................................ 726/3
See application file for complete search history.

(56) References Cited

U.S. PATENT DOCUMENTS

| | | | | |
|---|---|---|---|---|
| 2005/0221798 A1* | 10/2005 | Sengupta | .............. | H04W 12/06 455/411 |
| 2007/0273583 A1* | 11/2007 | Rosenberg | ............ | H04W 8/005 342/367 |
| 2010/0242092 A1* | 9/2010 | Harris | ...................... | G06F 21/53 726/3 |
| 2013/0058274 A1* | 3/2013 | Scherzer | ............... | H04L 63/107 370/328 |
| 2015/0020180 A1* | 1/2015 | Ngan | .................. | H04L 63/0892 726/7 |
| 2015/0113620 A1* | 4/2015 | Brewer | ............... | H04L 63/0853 726/7 |
| 2015/0229650 A1* | 8/2015 | Grigg | .................... | H04W 12/06 726/7 |

(Continued)

FOREIGN PATENT DOCUMENTS

JP 2017-126436 A 7/2017

*Primary Examiner* — Reza Nabi
(74) *Attorney, Agent, or Firm* — McDermott Will & Emery LLP

(57) ABSTRACT

An object of the present invention is to provide a terminal authentication device that can suppress a troublesome operation to authenticate a terminal when the terminal is connected to a network. A reception unit receives a beacon signal broadcasted from a terminal. A position determination unit determines the position of the terminal using the received beacon signal. A connection control unit controls the terminal to be connected to a mesh network in the case where the determined position of the terminal is within a predetermined authentication possible region.

12 Claims, 8 Drawing Sheets

(56) References Cited

U.S. PATENT DOCUMENTS

| | | | |
|---|---|---|---|
| 2015/0341331 A1* | 11/2015 | Weksler | H04W 12/122 |
| | | | 726/4 |
| 2016/0142394 A1* | 5/2016 | Ullrich | H04W 4/33 |
| | | | 726/7 |
| 2016/0226842 A1* | 8/2016 | Mower | H04W 12/06 |
| 2016/0242023 A1* | 8/2016 | Platt | G06Q 30/0256 |
| 2016/0294822 A1* | 10/2016 | George | H04W 12/06 |
| 2016/0295349 A1* | 10/2016 | George | H04W 4/80 |
| 2016/0343183 A1* | 11/2016 | Dumas | G07C 9/00309 |
| 2017/0202076 A1* | 7/2017 | Kurihara | H05B 47/19 |
| 2017/0337826 A1* | 11/2017 | Moran | G05D 1/0088 |
| 2018/0048630 A1* | 2/2018 | Griffin | H04L 63/0492 |
| 2018/0062851 A1* | 3/2018 | Cronholm | H04L 9/3247 |
| 2018/0103341 A1* | 4/2018 | Moiyallah, Jr | G06F 3/04842 |
| 2019/0130086 A1* | 5/2019 | Tovey | H04L 9/3247 |
| 2019/0188368 A1* | 6/2019 | Hastings | H04L 63/0492 |
| 2019/0265868 A1* | 8/2019 | Penilla | G07C 5/008 |
| 2020/0014733 A1* | 1/2020 | Vanderheeren | H04W 64/006 |
| 2020/0053096 A1* | 2/2020 | Bendersky | H04L 63/0492 |
| 2020/0092698 A1* | 3/2020 | Samuelsson | H04W 12/06 |
| 2020/0145414 A1* | 5/2020 | Romero | H04L 61/1511 |
| 2020/0228943 A1* | 7/2020 | Martin | H04W 4/80 |
| 2020/0236116 A1* | 7/2020 | Bower | H04L 63/107 |
| 2021/0176285 A1* | 6/2021 | Vanderheeren | H04M 3/563 |
| 2021/0279309 A1* | 9/2021 | Kappos | G06Q 50/01 |

* cited by examiner

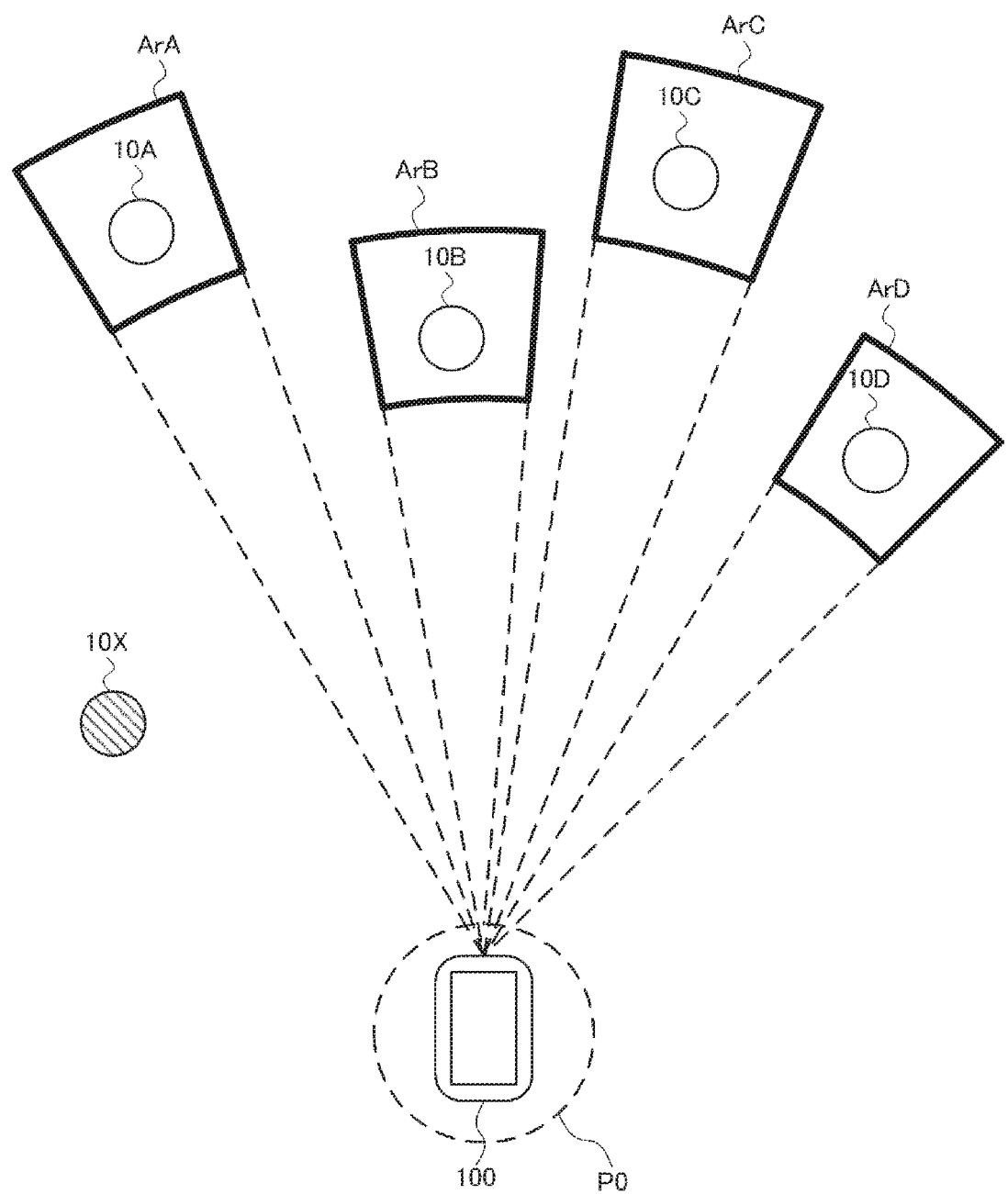

TERMINAL AUTHENTICATION DEVICE, TERMINAL AUTHENTICATION SYSTEM, AND TERMINAL AUTHENTICATION METHOD

CROSS-REFERENCE TO RELATED APPLICATIONS

The disclosure of Japanese Patent Application No. 2018-119876 filed on Jun. 25, 2018 including the specification, drawings and abstract is incorporated herein by reference in its entirety.

BACKGROUND

The present invention relates to a terminal authentication device, a terminal authentication system, and a terminal authentication method.

A network such as a mesh network configured to perform wireless communications between terminals has been known. In relation to the technique, Japanese Unexamined Patent Application Publication No. 2017-126436 discloses an illumination apparatus configuring a mesh network. Japanese Unexamined Patent Application Publication No. 2017-126436 discloses that in the case where the illumination apparatus does not participate in the mesh network, a communication path used by a communication terminal device is used to allow the illumination apparatus to participate in the mesh network. In Japanese Unexamined Patent Application Publication No. 2017-126436, in the case where the illumination apparatus participates in the mesh network, the illumination apparatus transmits a beacon for participation settings. When receiving the beacon from the illumination apparatus, the communication terminal device performs a predetermined operation to transmit authentication information for allowing the illumination apparatus to participate in the mesh network to the illumination apparatus. Accordingly, the illumination apparatus can participate in the mesh network.

SUMMARY

Here, in the technique related to Japanese Unexamined Patent Application Publication No. 2017-126436, it is necessary for the communication terminal device to perform the predetermined operation in the case where the illumination apparatus is allowed to participate in the mesh network. It is troublesome for an operator to perform the predetermined operation every time the illumination apparatus is allowed to participate in the mesh network as described above. In addition, the large number of illumination apparatuses to participate in the mesh network becomes more troublesome.

The other objects and novel features will become apparent from the description of the specification and the accompanying drawings.

According to an embodiment, a terminal authentication device includes: a reception unit that receives a signal broadcasted from a terminal; a position determination unit that determines the position of the terminal using the signal; and a connection control unit that controls the terminal to be connected to a network configured to perform communications between terminals in the case where the position of the terminal is within a predetermined first region.

Further, according to an embodiment, a terminal authentication system includes: one or more terminals that broadcast signals; and a terminal authentication device that authenticates the terminals. The terminal authentication device includes: a reception unit that receives the signal broadcasted from the terminal; a position determination unit that determines the position of the terminal using the signal; and a connection control unit that controls the terminal to be connected to a network configured to perform communications between the terminals in the case where the position of the terminal is within a predetermined first region.

Further, according to an embodiment, in a terminal authentication method, a signal broadcasted from a terminal is received, the position of the terminal is determined using the signal, and the terminal is controlled to be connected to a network configured to perform communications between terminals in the case where the position of the terminal is within a predetermined first region.

According to the above-described embodiments, it is possible to provide a terminal authentication device, a terminal authentication system, and a terminal authentication method that can suppress a troublesome operation to authenticate a terminal when the terminal is connected to a network.

BRIEF DESCRIPTION OF THE DRAWINGS

FIG. 8 is a diagram for showing a positional relation between the terminal authentication device and the terminals according to the second embodiment.

DETAILED DESCRIPTION

Figure 1:
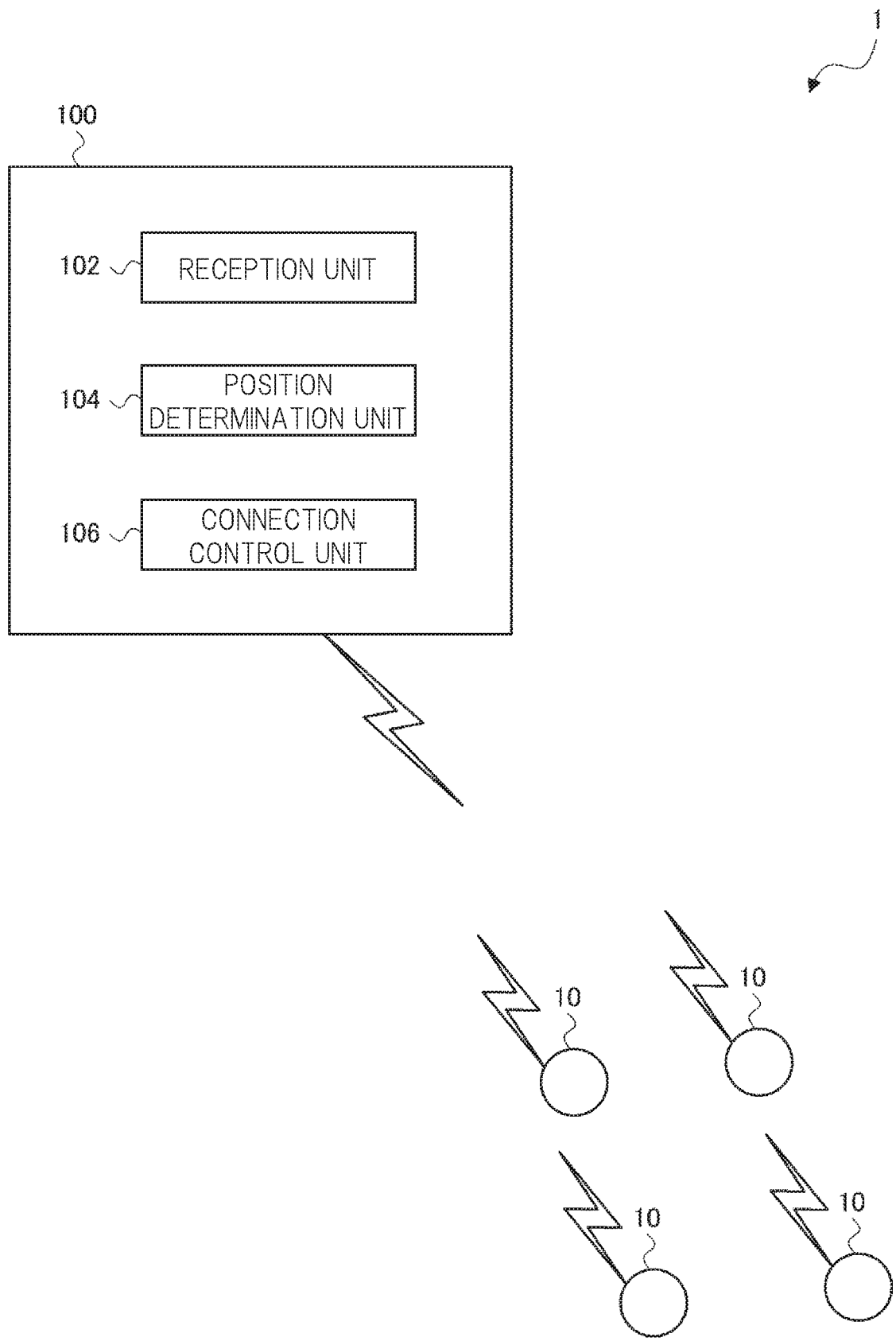
FIG. 1 is a diagram for showing a terminal authentication system according to a first embodiment.

Hereinafter, embodiments will be described with reference to the drawings. In order to clarify the description, the following description and drawings are appropriately omitted and simplified. It should be noted that the same elements are followed by the same signs in each drawing, and the duplicated explanation thereof is omitted as necessary.

The present invention will be described using the following embodiments while being divided into a plurality of sections or embodiments if necessary for convenience sake. However, except for a case especially specified, the sections or embodiments are not irrelevant to each other, and one has a relationship as a part or all of a modified example, an application, a detailed explanation, or a supplementary explanation of the other. Further, when the specification refers to the number of elements (including the number of pieces, values, amounts, ranges, and the like) in the following embodiments, the number is not limited to the specific number, but may be smaller or larger than the specific number, except for a case especially specified or a case obviously limited to the specific number in principle.

Further, the constitutional elements (including operational steps and the like) are not necessarily essential in the following embodiments except for a case especially specified or a case obviously deemed to be essential in principle. Likewise, when the specification refers to the shapes or positional relationships of the constitutional elements in the following embodiments, the present invention includes the constitutional elements that are substantially close or similar in shapes and the like, except for a case especially specified or a case obviously deemed not to be close or similar in principle. The same applies to the number (including the number of pieces, values, amounts, ranges, and the like).

Furthermore, each element illustrated in the drawings as a functional block for performing various processes can be configured using a CPU (Central Processing Unit), a memory, or other circuits as hardware, and can be realized by a program or the like loaded to a memory as software. Thus, a person skilled in the art can understand that these functional blocks can be realized in various forms such as only hardware, only software, or a combination thereof and are not limited to any one of these.

Outline of Embodiments

For example, the Bluetooth (registered trademark) mesh standard is a standard stipulating a mesh network. In the Bluetooth mesh standard, a procedure referred to as provisioning is conducted in order to connect (add) a terminal to a mesh network. The provisioning is conducted between a terminal requesting to participate (connect) in a mesh network and an apparatus that permits or does not permit the terminal to participate in the mesh network. Such an apparatus is referred to as a provisioner. The provisioner can be generally realized by an apparatus having an interface that accepts an input or an output from an operator of the provisioner such as a smartphone or a laptop. On the other hand, the terminal is, for example, a single-function device such as an illumination apparatus.

In the Bluetooth mesh standard, the provisioning is generally conducted according to the following procedure. First, the terminal performs a process referred to as "beaconing". Specifically, the terminal broadcasts a beacon signal (packet) referred to as "unprovisioned device beacon" that urges to start the provisioning procedure at certain intervals.

Next, the provisioner performs a process referred to as "invitation". Specifically, when receiving the beacon signal from the terminal, the provisioner transmits to the terminal a packet referred to as "Provisioning_Invite_PDU" used to notify the terminal of the start of the provisioning procedure. The terminal having received the packet sends back to the provisioner a packet referred to as "Provisioning Capabilities PDU" containing information such as a capable authentication procedure. Thereafter, a process referred to as "exchange public keys" is performed. Specifically, a public key is exchanged between the provisioner and the terminal.

Thereafter, a process referred to as "authentication" is performed. Specifically, when the exchange of the public key is completed, the provisioner and the terminal execute an authentication procedure in pairs. Then, a process referred to as "distribution of the provisioning data" is performed. Specifically, when the authentication procedure is completed, the provisioner transmits to the terminal a packet referred to as "Provisioning Data PDU" containing a long-term key referred to as a network key. Accordingly, the authentication of the terminal is established, and the provisioning procedure is completed.

At this time, in order to properly authenticate the terminal, a user reads a specific number displayed on a display or the like provided in the terminal, and inputs the same into the provisioner. The input number is sent back from the provisioner to the terminal. In the case where the number displayed on the terminal matches that input to the provisioner, a specific random number is exchanged between the provisioner and the terminal. Here, in the case where many terminals are connected to the mesh network, it is necessary for the user to read the specific numbers for all the terminals and to input the same into the provisioner. However, this operation is extremely troublesome for the user. On the other hand, if the above-described number exchange procedure is omitted without inputting the above-described number, there is a risk that an unintended terminal cannot be prevented from being connected to the mesh network. In addition, in order to conduct the above-described number exchange procedure, it is necessary to provide a device for outputting a number or the like in the terminal. Thus, the structure of the terminal becomes possibly complicated.

On the other hand, embodiments are configured so as to solve the above-described problems. Namely, the embodiments are configured in such a manner that the position of a terminal transmitting the beacon signal with respect to a provisioner is estimated and the terminal located at a specific position is automatically permitted to participate in a mesh network. In such a configuration, terminals to participate in the mesh network are collected in a predetermined authentication possible region, so that it is possible to suppress a troublesome operation to authenticate a terminal when the terminal is connected to the mesh network. In addition, many terminals are collected in the above-described specific position, so that these terminals can be automatically connected to the mesh network. Further, it is not necessary to provide a device for outputting a number or the like in a terminal in the embodiments, and thus the structure of the terminal can be simplified.

First Embodiment

Next, a first embodiment will be described.

FIG. 1 is a diagram for showing a terminal authentication system 1 according to a first embodiment. The terminal authentication system 1 has one or more terminals 10 and a terminal authentication device 100. The terminals 10 and the terminal authentication device 100 can be wirelessly communicated to each other. Namely, the terminals 10 and the terminal authentication device 100 have functions as wireless communication apparatuses.

The terminals 10 are, for example, illumination apparatuses, but the present invention is not limited to those. In the description of the embodiment shown below, the terminals 10 are assumed to be illumination apparatuses. It should be noted that the terminals 10 may be applied to, for example, air conditioners or smart meters such as electricity meters.

The terminals 10 can be connected to, for example, a network such as a mesh network configured to perform wireless communications between the terminals. In the description of the embodiment shown below, the terminals 10 can be connected to the mesh network. However, the network to which the terminals 10 are connected is not limited to the mesh network, but may be an ad hoc network or a peer-to-peer network.

As will be described later, the terminals 10 can be connected to the mesh network conforming to, for example, the Bluetooth mesh standard under the control of the terminal authentication device 100. It should be noted that the mesh network to which the terminals 10 are connected may conform to the ZigBee (registered trademark) standard. When the terminals 10 are connected to the mesh network, wireless communication between the terminals 10 or between the terminals 10 and a controller can be performed. It should be noted that the controller may be, for example, a mobile terminal that can perform wireless communications such as a smartphone or a tablet terminal.

In the case where the terminals 10 are illumination apparatuses, centralized management of the illumination apparatuses such as on/off or light adjustment can be performed by using the mesh network. In addition, the terminals 10 can communicate through other terminals 10 by a hop process in the mesh network. Namely, the light of an illumination apparatus (terminal 10) apart from the controller can be adjusted through another terminal 10 located between the terminal 10 and the controller.

The terminals 10 periodically broadcast beacon signals (radio waves) conforming to, for example, the BLE (Bluetooth Low Energy) standard. The beacon signals are configured using packets. The beacon signal contains, at least, identification information of the terminal 10 transmitting the beacon signal and information (connection request information) indicating that the terminal 10 is requested to be connected to the mesh network. In addition, the beacon signal may contain information indicating time when the terminal 10 emits the beacon signal. The beacon signal may contain, for example, a packet referred to as "unprovisioned device beacon". It should be noted that the signal transmitted by the terminal 10 is not limited to the beacon signal.

As will be described later, the terminal authentication device 100 performs a process (provisioning) to connect the terminals 10 to the mesh network. Namely, the terminal authentication device 100 has a function as a provisioner. As will be described later, the terminal authentication device 100 receives the beacon signals broadcasted from the terminals 10, so that the authentication for the terminals 10 can be conducted when the terminals 10 are connected to the mesh network.

The terminal authentication device 100 may be, for example, a mobile terminal that can perform wireless communications such as a laptop, a smartphone, or a tablet terminal. However, the terminal authentication device 100 need not be a mobile terminal. In the description of the embodiment shown below, the terminal authentication device 100 is a mobile terminal.

The terminal authentication device 100 has a function as a computer having a CPU, a memory, and a wireless communication device. The terminal authentication device 100 is configured using a processor such as a CPU, a storage device such as a memory, a wireless communication device, and various peripheral circuits. Namely, the terminal authentication device 100 functions as a computer.

In addition, the terminal authentication device 100 has a reception unit 102, a position determination unit 104, and a connection control unit 106. The terminal authentication device 100 may realize the constitutional elements such as the reception unit 102, the position determination unit 104, and the connection control unit 106 by allowing a processor to execute programs stored in the storage device. In addition, each constitutional element of the terminal authentication device 100 is not limited to be realized by software as a program, but may be realized by any combination of hardware, firmware, and software. In addition, each constitutional element of the terminal authentication device 100 may be realized using, for example, an integrated circuit that can be programmed by a user such as an FPGA (field-programmable gate array) or a microcomputer. In this case, a program configured using the constitutional elements may be realized using the integrated circuit. The same applies to the other embodiment to be described later.

The reception unit 102 receives the beacon signal broadcasted from the terminal 10. The position determination unit 104 determines the position of the terminal 10 using the received beacon signal. In the case where the determined position of the terminal 10 is within a predetermined authentication possible region (first region), the connection control unit 106 controls the terminal 10 to be connected to the mesh network.

Specifically, the terminal authentication device 100 adapts to AoA (Angle of Arrival) defined in the Bluetooth specifications. Thus, the position determination unit 104 can determine the arrival direction of the Bluetooth packet (beacon signal) with respect to the terminal authentication device 100. In addition, the position determination unit 104 can determine the reception intensity of the beacon signal. Thus, the position determination unit 104 can determine the distance of the terminal 10 to the terminal authentication device 100 on the basis of the reception intensity of the beacon signal.

Further, the terminal authentication device 100 stores information indicating the predetermined authentication possible region. The authentication possible region is a region having a range where, for example, a direction θ with respect to the terminal authentication device 100 satisfies $\theta1 \le \theta \le \theta2$ and a distance L from the terminal authentication device 100 satisfies $L1 \le L \le L2$. A user puts in the authentication possible region the terminal 10 that can be connected to the mesh network, namely, the terminal 10 for which the provisioning procedure may start. The connection control unit 106 transmits, for example, "Provisioning_Invite_PDU" to only the terminal 10 that transmits the beacon signal from the inside of the authentication possible region, and conducts the provisioning procedure.

The terminal authentication device 100 according to the first embodiment is configured as described above, and can automatically authenticate the terminals 10 located in the first region. Namely, it is only necessary for a user to put the terminal 10 in the authentication possible region, so that the authentication process for the terminal 10 and the connection process for the authenticated terminal 10 to the mesh network can be performed using the terminal authentication device 100 without a troublesome operation. Thus, the terminal authentication device 100 according to the first embodiment can suppress a troublesome operation required to authenticate the terminal 10 when the terminal 10 is connected to the mesh network. It should be noted that it is possible to suppress a troublesome operation required to authenticate the terminal 10 when the terminal 10 is connected to the mesh network even by using the terminal authentication system 1 having the terminal authentication device 100 and one or more terminals 10. In addition, it is possible to suppress a troublesome operation required to authenticate the terminal 10 when the terminal 10 is connected to the mesh network even by using a terminal authentication method and a program executed by the terminal authentication device 100.

Figure 2:
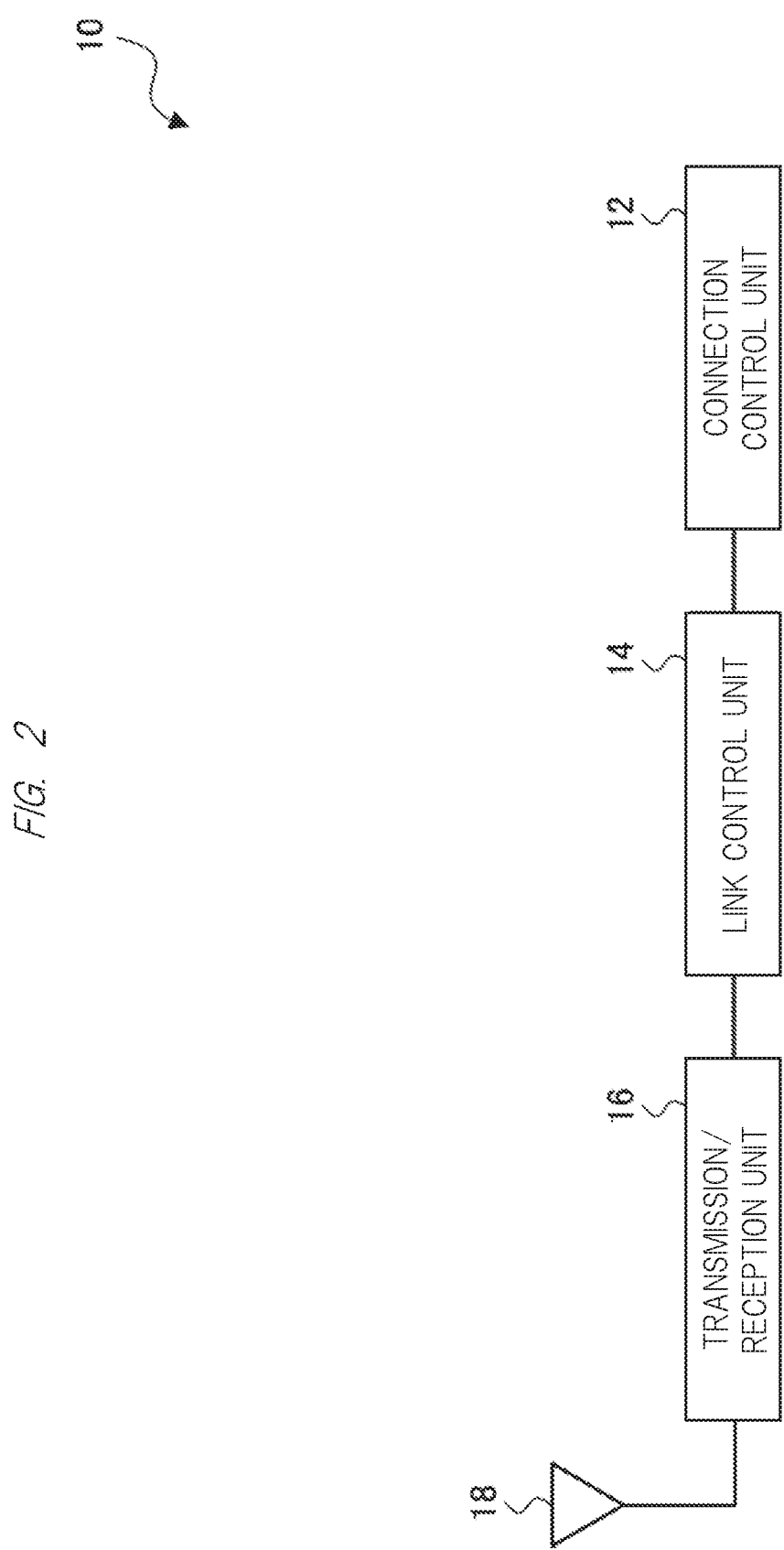
FIG. 2 is a diagram for showing a configuration of a terminal according to the first embodiment.

FIG. 2 is a diagram for showing a configuration of the terminal 10 according to the first embodiment. The terminal 10 has a connection control unit 12, a link control unit 14, a transmission/reception unit 16, and an antenna 18. The terminal 10 may be configured using a processor such as a CPU, a storage device such as a memory, a wireless communication device, and various peripheral circuits as similar to the terminal authentication device 100. Namely, the terminal 10 may have a function as a computer.

When the power supply of the terminal 10 is turned on, the connection control unit 12 instructs the link control unit 14 to broadcast a beacon signal #1 and a beacon signal #2 at certain intervals. Here, the beacon signal #1 is a beacon signal to urge start of the provisioning procedure. In addition, the beacon signal #2 is a beacon signal referred to as an advertising packet to which a continuous wave of up to 160 microseconds as a period referred to as "Constant tone Extension" stipulated in AoA defined in the Bluetooth specifications is added. The beacon signal #1 contains a connection request signal for the mesh network. In addition, the beacon signal #2 contains a continuous wave necessary for estimating a position viewed from the terminal authentication device 100 of the terminal 10. The link control unit 14 generates the beacon signals #1 and #2 to be broadcasted, and outputs the same to the transmission/reception unit 16 in a time-division manner. The transmission/reception unit 16 converts the beacon signals #1 and #2 to high frequencies to be transmitted to space. The transmission/reception unit 16 transmits the converted high-frequency beacons #1 and #2 (beacon signals #1 and #2) to the antenna 18. The antenna 18 radiates (broadcasts) the high-frequency beacons #1 and #2 to space.

Figure 3:
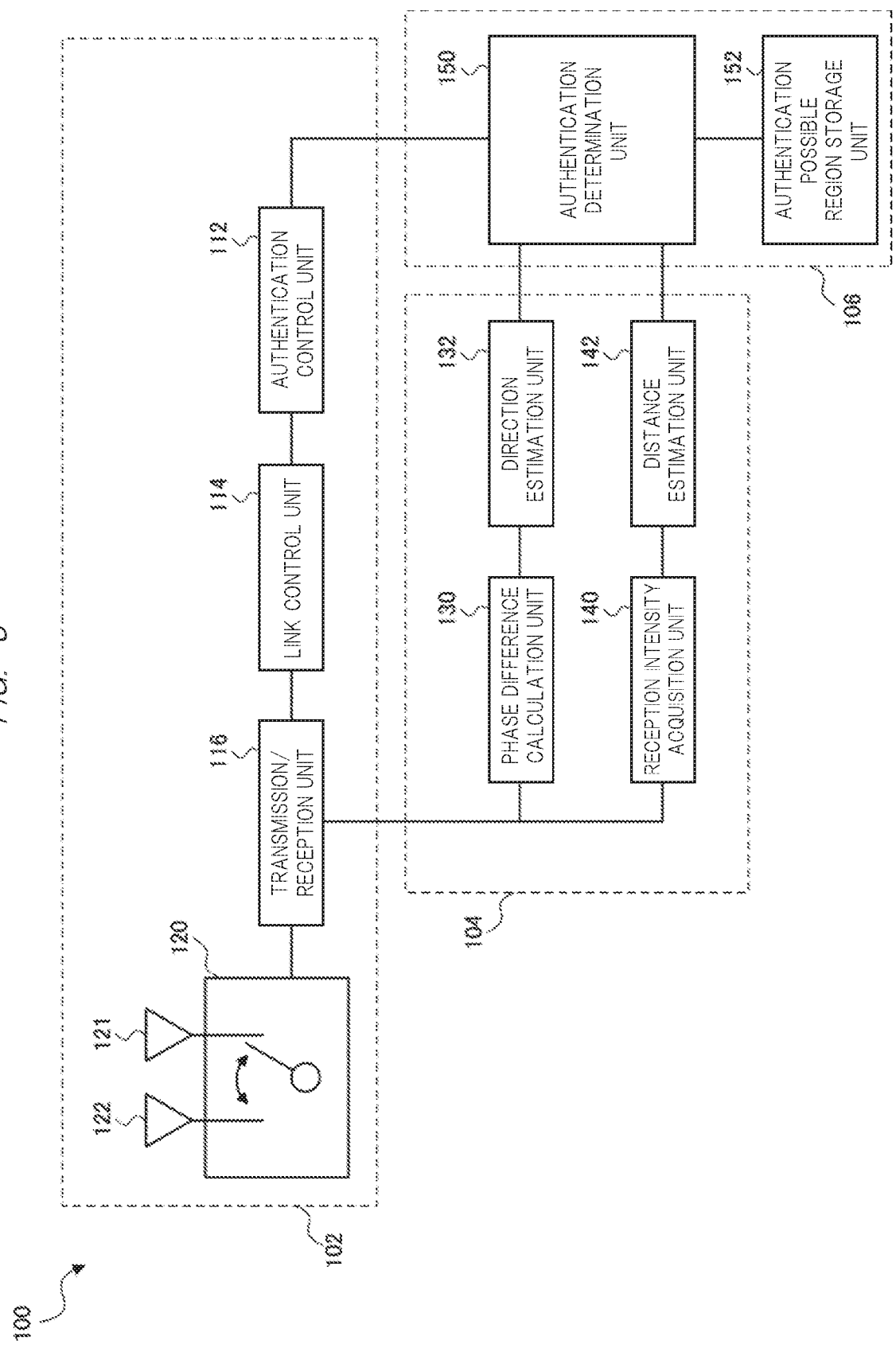
FIG. 3 is a diagram for showing a configuration of a terminal authentication device according to the first embodiment.

FIG. 3 is a diagram for showing a configuration of the terminal authentication device 100 according to the first embodiment. The terminal authentication device 100 has an authentication control unit 112, a link control unit 114, a transmission/reception unit 116, an antenna switching unit 120, and antennas 121 and 122. In addition, the terminal authentication device 100 has a phase difference calculation unit 130, a direction estimation unit 132, a reception intensity acquisition unit 140, and a distance estimation unit 142. Further, the terminal authentication device 100 has an authentication determination unit 150 and an authentication possible region storage unit 152.

Here, the authentication control unit 112, the link control unit 114, the transmission/reception unit 116, the antenna switching unit 120, and the antennas 121 and 122 can correspond to the reception unit 102 shown in FIG. 1. In addition, the phase difference calculation unit 130, the direction estimation unit 132, the reception intensity acquisition unit 140, and the distance estimation unit 142 can correspond to the position determination unit 104 shown in FIG. 1. In addition, the authentication determination unit 150 and the authentication possible region storage unit 152 can correspond to the connection control unit 106 shown in FIG. 1.

The authentication control unit 112 instructs the link control unit 114 to wait for the beacon signals #1 and #2 (high-frequency beacons #1 and #2). The link control unit 114 gives an instruction of a switching interval for the antennas 121 and 122 to the antenna switching unit 120. In addition, the link control unit 114 instructs the transmission/reception unit 116 to wait for the beacon signals #1 and #2 (high-frequency beacons #1 and #2). The high-frequency beacons #1 and #2 having reached the antenna 121 and the antenna 122 are transmitted to the transmission/reception unit 116.

The antenna switching unit 120 switches two antennas 121 and 122 to each other to receive radio waves at the switching intervals instructed by the link control unit 114. Thus, the high-frequency beacons #1 and #2 having reached the antenna 121 and the antenna 122, respectively, are separately transmitted to the transmission/reception unit 116. The transmission/reception unit 116 orthogonally detects the high-frequency beacons #1 and #2, and outputs the obtained beacon signals #1 and #2 to the link control unit 114, the phase difference calculation unit 130, and the reception intensity acquisition unit 140. The link control unit 114 determines that the received beacon signal #1 is a beacon to urge start of the provisioning procedure. Specifically, the link control unit 114 determines that the received beacon signal contains the connection request information for the mesh network. In this case, the authentication control unit 112 instructs the authentication determination unit 150 to authenticate the terminal 10 transmitting the beacon signal #1.

The phase difference calculation unit 130 calculates a phase difference φ that is a difference between the phase of the beacon signal #2 received by the antenna 121 and the phase of the beacon signal #2 received by the antenna 122. Then, the phase difference calculation unit 130 outputs the calculated phase difference φ to the direction estimation unit 132. The direction estimation unit 132 calculates the arrival direction of the beacon signal #2 using the phase difference cp. Accordingly, the direction estimation unit 132 estimates the direction θ of the terminal 10 transmitting the beacon signal #2 with respect to the terminal authentication device 100. The direction estimation unit 132 outputs the estimated direction θ to the authentication determination unit 150.

Figure 4:
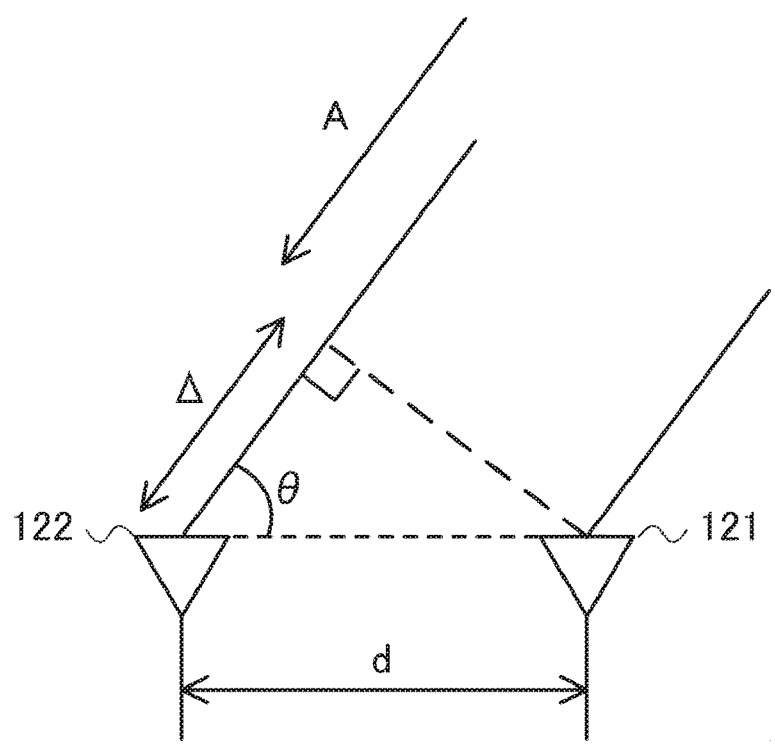
FIG. 4 is a diagram for explaining a method of calculating the arrival direction of a beacon signal.

FIG. 4 is a diagram for explaining a method of calculating the arrival direction of the beacon signal #2. As shown in FIG. 4, it is assumed that an interval between the antenna 121 and the antenna 122 is d[m]. In addition, it is assumed that the arrival direction of a radio wave (beacon signal #2) arrived from the direction of an arrow A is θ. Here, it is assumed that θ is 0 in the direction viewing the antenna 121 from the antenna 122 and the counterclockwise direction is positive. Thus, when the radio wave arrives from the front of the antennas 121 and 121, the arrival direction θ of the radio wave is 90 degrees (π/2).

As shown in FIG. 4, an optical path difference Δ of the radio wave occurs between the antenna 121 and the antenna 122. The optical path difference Δ is represented by d cos θ. The phase difference φ occurs between the antenna 121 and the antenna 122 due to the optical path difference Δ. Thus, when λ is the carrier wavelength [m] of the high-frequency beacon #2, the following equation (1) is established. The direction estimation unit 132 calculates the arrival direction of the high-frequency beacon #2, namely, the direction θ of the terminal 10 using the equation (1). It should be noted that λ shown in the equation (1) is known, and the direction estimation unit 132 can store λ.

[Equation 1]

$$\theta = \cos^{-1}\left(\frac{\phi\lambda}{2\pi d}\right) \quad (1)$$

The reception intensity acquisition unit 140 acquires the reception intensity of the high-frequency beacon #2. Specifically, the reception intensity acquisition unit 140 measures the RSSI (Received Signal Strength Indicator) value of the high-frequency beacon #2. The reception intensity acquisition unit 140 outputs the acquired reception intensity to the distance estimation unit 142. The distance estimation unit 142 estimates the distance L[m] of the terminal 10 transmitting the beacon signal #2 to the terminal authentication device 100. Specifically, the distance estimation unit 142 calculates the distance L using the Friis Transmission Formula represented by the following equation (2).

[Equation 2]

$$P_r = \frac{P_t G_t G_r \lambda^2}{(4\pi L)^2} \quad (2)$$

Here, $P_r$ is an RSSI value [W]. In addition, $P_t$ is a beacon transmission electric power [W]. In addition, $G_t$ is the gain (multiple) of the antenna 18 of the terminal 10. In addition, $G_r$ is the gain (multiple) of each of the antennas 121 and 122 of the terminal authentication device 100. It should be noted that the values of $\lambda$, $P_t$, $G_t$, and $G_r$ are known, and the distance estimation unit 142 can store $\lambda$, $P_t$, $G_t$, and $G_r$.

It should be noted that the operation of the distance estimation unit 142 (position determination unit 104) is not limited to the estimation of the distance L between the terminal authentication device 100 and the terminal 10 using RSSI. For example, the distance estimation unit 142 may estimate the distance L using the propagation time of the high-frequency beacon #2. In this case, when the link control unit 14 of the terminal 10 generates the beacon signal #2, the terminal 10 contains information indicating the emission time of the beacon signal #2 in the beacon signal #2. In addition, the distance estimation unit 142 estimates the distance L using a difference between the emission time and the reception time of the beacon signal #2 as propagation time.

The authentication possible region storage unit 152 stores information indicating the authentication possible region. For example, the authentication possible region is a region having a range where the direction θ with respect to the terminal authentication device 100 satisfies θ1≤θ≤θ2, and the distance L from the terminal authentication device 100 satisfies L1≤L≤L2. In this case, the authentication possible region storage unit 152 stores information indicating the predetermined range θ1≤θ≤θ2 of the direction θ and the predetermined range L1≤L≤L2 of the distance L.

The authentication determination unit 150 determines whether or not the terminal 10 transmitting the beacon signal #2 is within the authentication possible region on the basis of the estimated direction θ and distance L. This is equal to the determination whether or not the terminal 10 transmitting the beacon signal #1 urging start of the provisioning procedure is within the authentication possible region. In addition, the authentication determination unit 150 controls the terminal 10 located within the authentication possible region to be connected to the mesh network. Specifically, the authentication determination unit 150 determines whether or not the direction θ satisfies θ1≤θ≤θ2 and the distance L satisfies L1≤L≤L2. In addition, in the case where these conditions are satisfied, the authentication determination unit 150 conducts the above-described provisioning procedure for the terminal 10. Accordingly, the terminal 10 can be connected to and participate in the mesh network.

Figure 5:
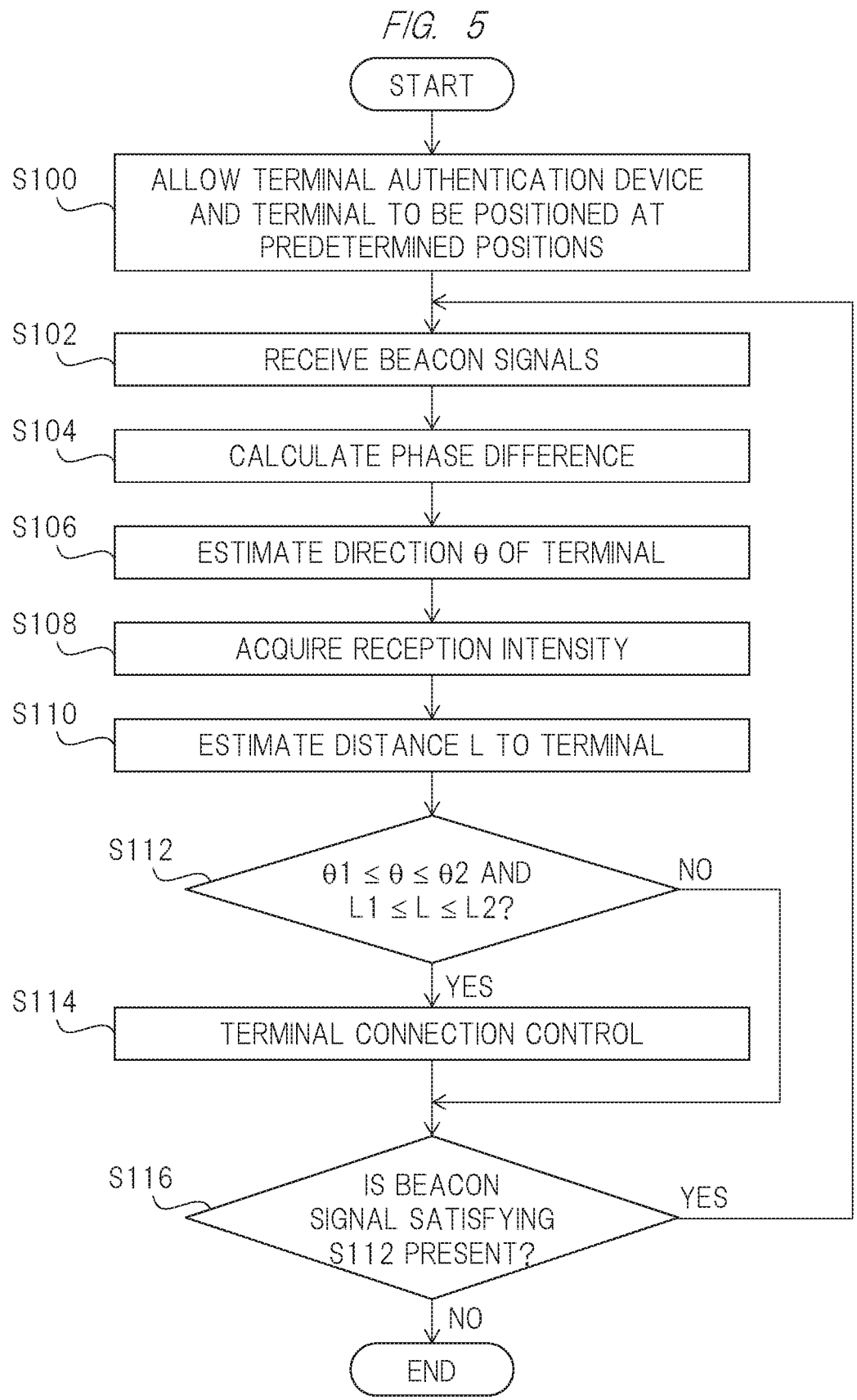
FIG. 5 is a flowchart for showing a terminal authentication method according to the first embodiment.

FIG. 5 is a flowchart for showing a terminal authentication method according to the first embodiment. First, a user allows the terminal authentication device 100 and the terminal 10 to be positioned at predetermined positions (Step S100). Specifically, the user allows the terminal authentication device 100 as a provisioner to be positioned at the predetermined position where a positional relation with the authentication possible region is defined. In addition, the user puts the terminal 10 to participate in the mesh network in the authentication possible region. In the case where there are plural terminals 10 to participate in the mesh network, the user may put the terminals 10 in the authentication possible region.

Next, when the terminal 10 broadcasts the beacon signals #1 and #2 in a time-division manner, the reception unit 102 (the antennas 121 and 122 and the transmission/reception unit 116) of the terminal authentication device 100 receives the beacon signals #1 and #2 (Step S102). The position determination unit 104 (phase difference calculation unit 130) calculates the phase difference φ of the beacon signal #2 received by the antennas 121 and 122 as described above (Step S104). The position determination unit 104 (direction estimation unit 132) estimates the direction θ of the terminal 10 transmitting the beacon signal #2 with respect to the terminal authentication device 100 on the basis of the phase difference φ as described above (Step S106).

The position determination unit 104 (reception intensity acquisition unit 140) acquires the reception intensity of the beacon signal #2 as described above (Step S108). The position determination unit 104 (distance estimation unit 142) estimates the distance L of the terminal 10 transmitting the beacon signal #2 to the terminal authentication device 100 on the basis of the reception intensity as described above (Step S110).

The connection control unit 106 (authentication determination unit 150) determines whether or not the direction θ is equal to or larger than θ1 and equal to or smaller than θ2 and the distance L is equal to or larger than L1 and equal to or smaller than L2, namely, the conditions of "θ1≤θ≤θ2 and L1≤L≤L2" are satisfied (Step S112). In other words, the authentication determination unit 150 determines whether or not the terminal 10 transmitting the beacon signal #1 is within the authentication possible region. In the case where the conditions of "θ1≤θ≤θ2 and L1≤L≤L2" are satisfied (YES in S112), the connection control unit 106 (authentication determination unit 150) controls the terminal 10 transmitting the beacon signal #1 to be connected to the mesh network as described above (Step S114). Accordingly, the terminal 10 located within the authentication possible region is connected to the mesh network. In addition, the terminal 10 connected to the mesh network stops the transmission of the beacon signals #1 and #2. On the other hand, in the case where the conditions of "θ1≤θ≤θ2 and L1≤L≤L2" are not satisfied (NO in S112), the connection control unit 106 (authentication determination unit 150) does not perform the process of S114. Namely, the connection control unit 106 does not connect the terminal 10 outside the authentication possible region to the mesh network. At this time, the authentication control unit 112 may store the identification information of the terminal 10 determined to be located outside the authentication possible region as authentication impossible identification information.

The terminal authentication device 100 determines whether or not other beacon signals #2 satisfying S112 are present (Step S116). In the case where the beacon signals #2 satisfying S112 are present (YES in S116), the processes of S102 to S114 are repeated. On the other hand, in the case where no beacon signals #2 satisfying S112 are present (NO in S116), the terminal authentication device 100 terminates the process. Namely, the connection control unit 106 (authentication determination unit 150) controls the terminals 10 located within the authentication possible region to be connected to the network until the terminals 10 that are located within the authentication possible region but are not connected to the network are not present.

For example, when receiving the beacon signals #1 and #2 in the process of S102, the authentication control unit 112 determines whether or not the identification information contained in the beacon signals #1 and #2 corresponds to the authentication impossible identification information. In the case where the identification information contained in the beacon signals #1 and #2 corresponds to the authentication impossible identification information, the terminal authentication device 100 does not perform the processes subsequent to S104. On the other hand, in the case where the identification information contained in the beacon signals #1 and #2 does not correspond to the authentication impossible identification information, the terminal authentication device 100 performs the processes of S104 to S114 by referring to the beacon signal #2. In addition, in the case where only the beacon signals #1 and #2 containing the identification information corresponding to the authentication impossible identification information are present to be received, the terminal authentication device 100 determines that all the terminals 10 located within the authentication possible region have been connected to the mesh network, and terminates the process. It should be noted that even in the case where no beacon signals #1 and #2 are received, the terminal authentication device 100 determines that all the terminals 10 located within the authentication possible region have been connected to the mesh network, and terminates the process.

Figure 6:
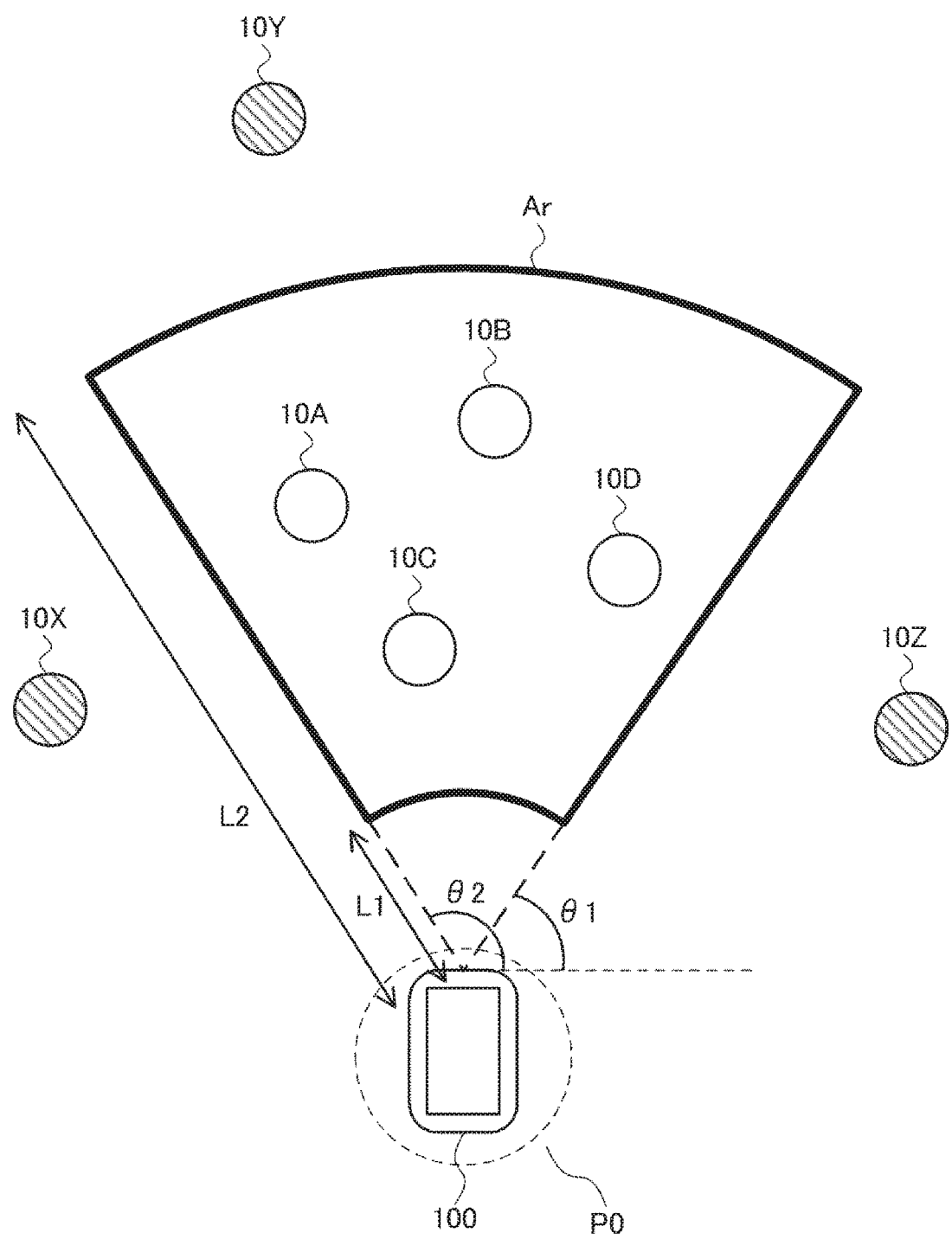
FIG. 6 is a diagram for exemplifying a positional relation between the terminal authentication device and the terminals according to the first embodiment.

FIG. 6 is a diagram for exemplifying a positional relation between the terminal authentication device 100 and the terminals 10 according to the first embodiment. The terminal authentication device 100 is positioned in a terminal authentication position P0. For example, a user having the terminal authentication device 100 may be positioned in the terminal authentication position P0. Alternatively, a frame for placing the terminal authentication device 100 may be provided on a floor or a stand.

In addition, an authentication possible region Ar is provided at a position where a positional relation with the terminal authentication position P0 is preliminarily defined. The authentication possible region Ar is formed in a shape (hereinafter, referred to as a "fan shape") obtained by expanding the side surface of a truncated cone. The center angle of the fan shape is θ2−θ1. In addition, the distance from the terminal authentication device 100 to the inner circumference of the fan shape is L1, and the distance to the outer circumference thereof is L2.

Here, it is assumed that the terminals 10 to be connected to the mesh network are terminals 10A, 10B, 10C, and 10D. At this time, a user puts the terminals 10A, 10B, 10C, and 10D in the authentication possible region Ar. On the other hand, it is assumed that terminals 10X, 10Y, and 10Z that are not to be connected to the mesh network are present outside the authentication possible region Ar.

In such a case, when receiving the beacon signals #1 and #2 from the terminals 10A, 10B, 10C, and 10D, the terminal authentication device 100 allows the terminals 10A, 10B, 10C, and 10D to be automatically connected to the mesh network by the above-described method. On the other hand, even when receiving the beacon signals #1 and #2 from the terminals 10X, 10Y, and 10Z, the terminal authentication device 100 does not allow the terminals 10X, 10Y, and 10Z to be connected to the mesh network.

Here, a concrete example to which the terminal authentication system 1 according to the first embodiment is applied will be described. It is assumed that the terminal 10 is an illumination apparatus and the terminal authentication device 100 is a mobile terminal. In addition, it is assumed that the terminal 10 as an illumination apparatus is installed on the ceiling of a building in a construction site for the building. In this case, before installing the terminal 10 as an illumination apparatus in the building, a user first puts the terminal 10 in the authentication possible region (S100). In addition, the user brings the terminal authentication device 100 as a mobile terminal to the terminal authentication position P0 (S100). In addition, the terminal authentication device 100 performs a process to connect the terminal 10 as an illumination apparatus to the mesh network (S102 to S116). In addition, the user installs the terminal 10 (illumination apparatus) connected to the mesh network in the building. As described above, it is possible to allow an illumination apparatus to be easily connected to the mesh network before installing the illumination apparatus by using the terminal authentication device 100 according to the first embodiment.

As described above, in the first embodiment, only by putting the terminals 10 to be connected to the mesh network in the authentication possible region Ar, only the terminals 10 located in the authentication possible region Ar can be connected to the mesh network. In other words, it is possible to prevent the terminals 10 located outside the authentication possible region Ar from being connected to the network. Thus, the terminal authentication device 100 according to the first embodiment can suppress a troublesome operation required to authenticate the terminal 10 when the terminal 10 is connected to the mesh network. Further, in other words, the terminal authentication device 100 according to the first embodiment can allow the terminal 10 to be connected to the mesh network to be easily connected to the mesh network.

Further, in the first embodiment, the connection control unit 106 (authentication determination unit 150) controls the terminals 10 located within the authentication possible region to be connected to the network until the terminals 10 that are located within the authentication possible region but are not connected to the network are not present. Accordingly, in the first embodiment, it is possible to immediately authenticate plural terminals 10 only by putting the terminals 10 in the authentication possible region Ar. Namely, in the first embodiment, it is possible to authenticate plural terminals 10 in a short time only by putting the terminals 10 in the authentication possible region Ar.

Further, in the first embodiment, in the case where the terminal authentication device 100 is located at a specific position, the position determination unit 104 calculates the distance L and the direction θ using the beacon signal #2. In addition, in the case where the distance L and the direction θ fall within predetermined ranges, the connection control unit 106 controls the terminal 10 to be connected to the mesh network. Accordingly, a positional relation between the terminal authentication device 100 and the authentication possible region Ar can be certainly and easily defined. Thus, it is possible to easily specify the position of the terminal 10 to be authenticated in the first embodiment.

Further, in the first embodiment, only by putting the terminals 10 to be connected to the mesh network in the authentication possible region Ar, only the terminals 10 located in the authentication possible region Ar can be connected to the mesh network. Thus, it not necessary to provide a function of allowing the terminal 10 to output a number or the like in the above-described provisioning. Accordingly, the authentication can be performed without complicating the structure of the terminal 10.

Second Embodiment

Next, a second embodiment will be described. The second embodiment is different from the first embodiment in that plural authentication possible regions are present. The other configurations of the second embodiment are substantially the same as the first embodiment.

In the terminal authentication device 100 according to the second embodiment, the authentication possible region storage unit 152 stores information indicating a plurality of authentication possible regions. In the case where the terminal 10 is positioned at any one of the authentication possible regions, the authentication determination unit 150 (connection control unit 106) controls the terminal 10 to be connected to the mesh network. Namely, the authentication determination unit 150 conducts the above-described provisioning procedure for the terminal 10 positioned in any one of the authentication possible regions. Accordingly, the terminal 10 can be connected to and participate in the mesh network.

Figure 7:
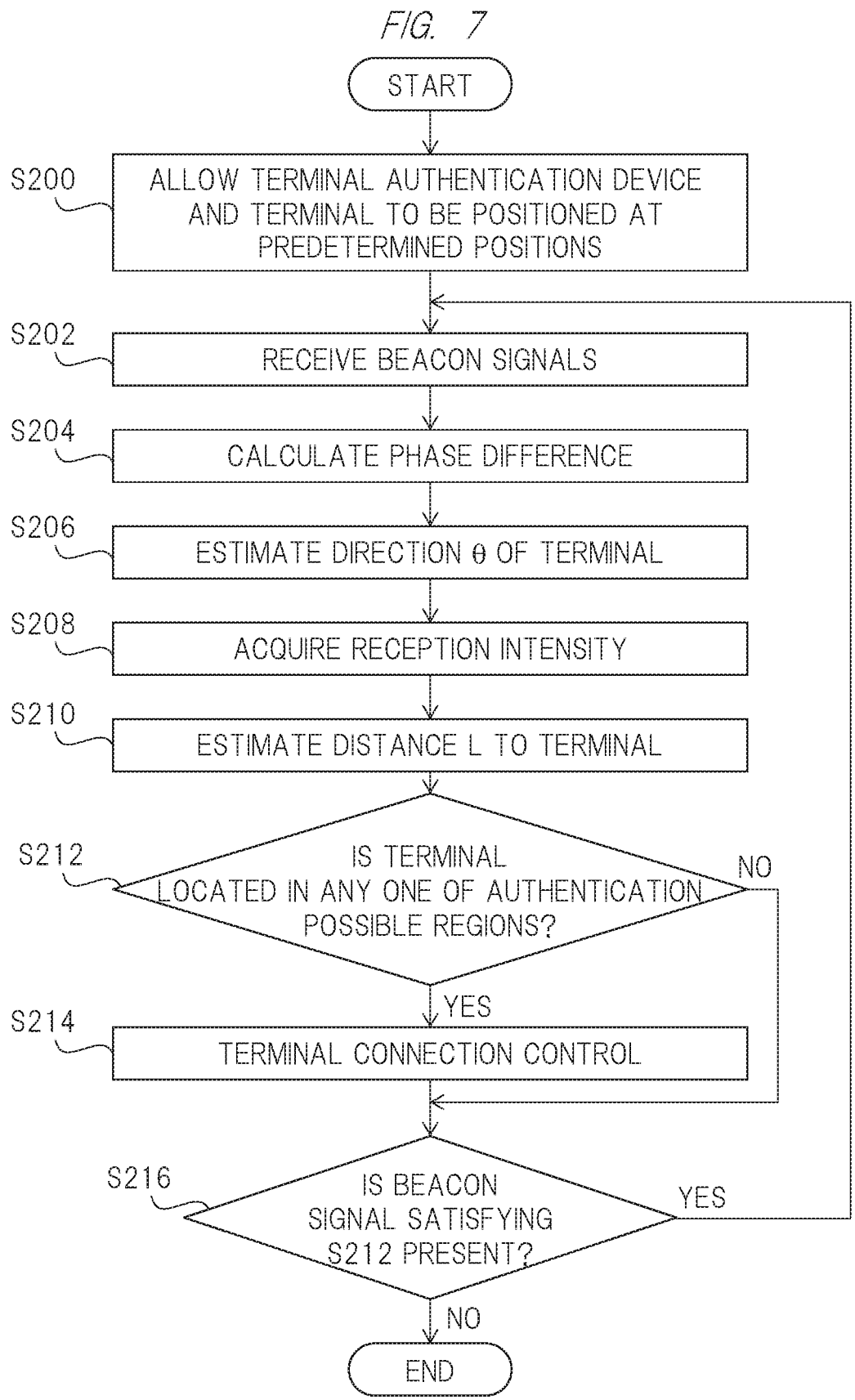
FIG. 7 is a flowchart for showing a terminal authentication method according to a second embodiment.

FIG. 7 is a flowchart for showing a terminal authentication method according to the second embodiment. In addition, FIG. 8 is a diagram for showing a positional relation between the terminal authentication device 100 and the terminals 10 according to the second embodiment. First, a user allows the terminal authentication device 100 and the terminals 10 to be positioned at predetermined positions (Step S200). Specifically, the user allows the terminals 10 to be connected to the mesh network to be positioned at the respective authentication possible regions. In addition, the user allows the terminal authentication device 100 as a provisioner to be positioned at the predetermined position where a positional relation with the authentication possible region is defined.

In the example shown in FIG. 8, a terminal 10A is positioned at an authentication possible region ArA. In addition, a terminal 10B is positioned at an authentication possible region ArB. A terminal 10C is positioned at an authentication possible region ArC. A terminal 10D is positioned at an authentication possible region ArD. In addition, the terminal authentication device 100 is positioned at a terminal authentication position P0. Here, it is assumed that a positional relation between the terminal authentication position P0 and the authentication possible regions ArA, ArB, ArC, and ArD is preliminarily defined. It should be noted that a terminal 10X is not positioned at any one of the authentication possible regions.

In addition, it is assumed that the connection control unit 106 (authentication possible region storage unit 152) preliminarily stores the range of each of the authentication possible regions ArA, ArB, ArC, and ArD. Here, it is assumed that the range of the authentication possible region ArA is "$\theta A \leq \theta \leq \theta A2$ and $LA1 \leq L \leq LA2$". It is assumed that the range of the authentication possible region ArB is "$\theta B1 \leq \theta \leq \theta B2$ and $LB1 \leq L \leq B2$". It is assumed that the range of the authentication possible region ArC is "$\theta C1 \leq \theta \leq \theta C2$ and $LC1 \leq L \leq C2$". It is assumed that the range of the authentication possible region ArD is "$\theta D1 \leq \theta \leq \theta D2$ and $LD1 \leq L \leq LD2$".

Next, the terminal authentication device 100 receives the beacon signals #1 and #2 from each terminal 10 to determine the position of each terminal 10 (Steps S202 to S210). Here, since the processes of S202 to S210 are substantially the same as those of S102 to S110 shown in FIG. 5, the explanation thereof will be omitted. Accordingly, the terminal authentication device 100 acquires the direction $\theta$ and the distance L of the terminal 10 transmitting the beacon signals #1 and #2.

The connection control unit 106 (authentication determination unit 150) determines whether or not the terminal 10 transmitting the beacon signals #1 and #2 is located in any one of a plurality of authentication possible regions (Step S212). In the case where it is determined that the terminal 10 is located in any one of the authentication possible regions (YES in S212), the connection control unit 106 (authentication determination unit 150) controls the terminal 10 to be connected to the mesh network as similar to the process of S114 (Step S214).

On the other hand, in the case where it is determined that the terminal 10 is not located in any one of the authentication possible regions (YES in S212), the connection control unit 106 (authentication determination unit 150) does not perform the process of S214. Namely, the connection control unit 106 does not connect the terminal 10 outside any one of the authentication possible regions to the mesh network. At this time, the authentication control unit 112 may store identification information of the terminal 10 determined to be not located in any one of the authentication possible regions as authentication impossible identification information. In addition, the connection control unit 106 (authentication determination unit 150) controls the terminals 10 located within the authentication possible regions to be connected to the network until the terminals 10 that are located within the authentication possible regions but are not connected to the network are not present as similar to the process of S116 (Step S216).

In the example shown in FIG. 8, the direction $\theta$ and the distance L acquired on the basis of the beacon signals #1 and #2 received from the terminal 10A can satisfy "$\theta A1 \leq \theta \leq \theta A2$ and $LA1 \leq L \leq LA2$". Thus, the authentication determination unit 150 determines that the terminal 10A transmitting the beacon signals #1 and #2 is positioned at the authentication possible region ArA. Thus, the authentication determination unit 150 controls the terminal 10A to be connected to the mesh network. The authentication determination unit 150 similarly controls the terminals 10B, 10C, and 10D to be connected to the mesh network.

On the other hand, the terminal 10X is not positioned at any one of the authentication possible regions. Namely, the direction $\theta$ and the distance L on the basis of the beacon signals #1 and #2 received from the terminal 10X do not satisfy any one of "$\theta A1 \leq \theta \leq A2$ and $LA1 \leq L \leq LA2$", "$\theta B1 \leq \theta \leq \theta B2$ and $LB1 \leq L \leq LB2$", "$\theta C1 \leq \theta \leq \theta C2$ and $LC1 \leq L \leq LC2$", and "$\theta D1 \leq \theta \leq \theta D2$ and $LD1 \leq L \leq LD2$". Thus, the authentication determination unit 150 does not perform a process of connecting the terminal 10X to the mesh network.

Here, a concrete example to which the terminal authentication system 1 according to the second embodiment is applied will be described. It is assumed that the terminal 10 is an illumination apparatus and the terminal authentication device 100 is a mobile terminal. In addition, it is assumed that the terminal 10 as an illumination apparatus is installed on the ceiling of a building. In addition, it is assumed that the authentication possible region storage unit 152 of the terminal authentication device 100 preliminarily stores the position where the illumination apparatus is installed as an authentication possible region. It should be noted that the terminal authentication device 100 may acquire the installation position of the illumination apparatus, namely, the authentication possible region from a CAD drawing or the like of the building.

In this case, a user first installs the terminal 10 as an illumination apparatus at a predetermined position of the building such as a ceiling (S200). In addition, the user brings the terminal authentication device 100 as a mobile terminal to the terminal authentication position P0 (S200). In addition, the terminal authentication device 100 performs a process of connecting the terminal 10 as an illumination apparatus to the mesh network (S202 to S216). As described above, it is possible to easily connect the illumination apparatus to the mesh network even after the installation of the illumination apparatus by using the terminal authentication device 100 according to the second embodiment.

Further, the terminal authentication device 100 according to the second embodiment can exhibit substantially the same effect as that exhibited by the terminal authentication device 100 according to the first embodiment as described above. Namely, the terminal authentication device 100 according to the second embodiment can easily connect the terminal 10 to be connected to the mesh network to the mesh network. The terminal authentication device 100 according to the second embodiment can easily specify the position of the terminal 10 to be authenticated. In addition, the authentication can be performed without complicating the structure of the terminal 10 in the second embodiment.

Modified Example

It should be noted that the embodiments are not limited to those described above, and can be appropriately changed without departing the scope thereof. For example, in the flowchart according to each of the above-described embodiments, the order of each process can be appropriately changed. For example, the processes of S108 and S110 in FIG. 5 may be performed before the processes of S104 and S106, or may be performed in parallel with the processes of S104 and S106. The same applies to FIG. 7. In addition, a part of the processes performed by the constitutional elements described in the above embodiments may be performed by other constitutional elements. In addition, the terminal 10 separately transmits the beacon signal #1 containing a connection request signal to the mesh network and the beacon signal #2 for position estimation of the terminal 10 in the above-described embodiments. However, the present invention is not limited to such a configuration. The terminal 10 may transmit one beacon signal as long as the position of the terminal 10 can be estimated by using the beacon signal containing a connection request signal to the mesh network.

In addition, the shape of the authentication possible region is a fan shape in the above-described embodiments. However, the present invention is not limited to such a configuration. The shape of the authentication possible region may be an arbitrary shape. In this case, the authentication possible region storage unit 152 may store a range in the coordinate of the authentication possible region. Namely, the authentication possible region storage unit 152 may store a set of positional coordinates contained in the authentication possible region. Further, in this case, the position determination unit 104 may determine the positional coordinate of the terminal 10 on the basis of the direction θ and the distance L and the position information of the terminal authentication device 100. It should be noted that the position information of the terminal authentication device 100 can be acquired by using, for example, a GPS (Global Positioning System) function provided in the terminal authentication device 100. Thus, in this case, it is not necessary for the terminal authentication device 100 to be positioned at the terminal authentication position, and the terminal authentication device 100 can perform the above-described process while being placed at an arbitrary position. However, even if the position information of the terminal authentication device 100 cannot be acquired, it is possible to easily authenticate the terminal 10 using the configurations of the above-described embodiments.

In addition, the above-described program can be stored in and supplied to a computer using various types of non-transitory computer readable media. The non-transitory computer readable media include various types of tangible recording media. Examples of the non-transitory computer readable media include a magnetic recording medium (for example, a flexible disk, a magnetic tape, or a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, or a RAM (Random Access Memory)). Further, the program may be supplied to a computer by various types of transitory computer readable media. Examples of the transitory computer readable media include an electrical signal, an optical signal, and an electromagnetic wave. The program can be supplied to a computer by the transitory computer readable media via a wired communication path such as a wire or an optical fiber, or a wireless communication path.

The invention achieved by the inventors has been concretely described above on the basis of the embodiments. However, it is obvious that the present invention is not limited to the above-described embodiments, and can be variously changed without departing from the scope thereof.

What is claimed is:

1. A terminal authentication device comprising:
    a reception unit that receives a signal broadcasted from a terminal;
    a position determination unit that determines the position of the terminal using the signal; and
    a connection control unit that controls the terminal to be connected to a network configured to perform communications between terminals in the case where the position of the terminal is within a predetermined first region,
    wherein the predetermined first region having a fan shape boundary,
    wherein in the case where the terminal authentication device is located at a specific place, the position determination unit calculates a distance from the terminal authentication device to the terminal and a direction of the terminal with respect to the terminal authentication device using the signal,
    wherein in the case where the distance and the direction fall within predetermined ranges, the connection control unit controls the terminal to be connected to the network,
    wherein the fan shape boundary is based on the distance and the direction, and
    wherein the network comprises a mesh network.

2. The terminal authentication device according to claim 1,
    wherein the reception unit receives signals broadcasted from the terminals;
    wherein the position determination unit determines the position of each terminal using the signal received from each terminal, and
    wherein the connection control unit controls the terminal located within the first region to be connected to the network until the terminals that are located within the first region but are not connected to the network are not present.

3. The terminal authentication device according to claim 1, wherein a plurality of first regions is present, and
wherein in the case where the terminal is located at any one of the first regions, the connection control unit controls the terminal to be connected to the network.

4. The terminal authentication device according to claim 1,
wherein the connection control unit controls the terminal located within the first region to be connected to a mesh network.

5. A terminal authentication system comprising:
one or more terminals that broadcast signals; and
a terminal authentication device that authenticates the terminals,
wherein the terminal authentication device includes:
a reception unit that receives the signal broadcasted from the terminal;
a position determination unit that determines the position of the terminal using the signal; and
a connection control unit that controls the terminal to be connected to a network configured to perform communications between the terminals in the case where the position of the terminal is within a predetermined first region,
wherein the predetermined first region having a fan shape boundary,
wherein in the case where the terminal authentication device is located at a specific place, the position determination unit calculates a distance from the terminal authentication device to the terminal and a direction of the terminal with respect to the terminal authentication device using the signal,
wherein in the case where the distance and the direction fall within predetermined ranges, the connection control unit controls the terminal to be connected to the network,
wherein the fan shape boundary is based on the distance and the direction, and
wherein the network comprises a mesh network.

6. The terminal authentication system according to claim 5,
wherein the reception unit receives signals broadcasted from the terminals,
wherein the position determination unit determines the position of each terminal using the signal received from each terminal, and
wherein the connection control unit controls the terminal located within the first region to be connected to the network until the terminals that are located within the first region but are not connected to the network are not present.

7. The terminal authentication system according to claim 5,
wherein a plurality of first regions is present, and
wherein in the case where the terminal is located at any one of the first regions, the connection control unit controls the terminal to be connected to the network.

8. The terminal authentication system according to claim 5,
wherein the connection control unit controls the terminal located within the first region to be connected to a mesh network.

9. A terminal authentication method comprising the steps of:
receiving a signal broadcasted from a terminal;
determining the position of the terminal using the signal;
controlling the terminal to be connected to a network configured to perform communications between terminals in the case where the position of the terminal is within a predetermined first region;
allowing a device executing the terminal authentication method to be positioned at a specific place;
calculating, using the signal, a distance from the device to the terminal and a direction of the terminal with respect to the device; and
controlling, in the case where the distance and the direction fall within predetermined ranges, the terminal to be connected to the network,
wherein the predetermined first region having a fan shape boundary,
wherein the fan shape boundary is based on the distance and the direction, and
wherein the network comprises a mesh network.

10. The terminal authentication method according to claim 9, comprising the steps of:
receiving signals broadcasted from the terminals;
determining the position of each terminal using the signal received from each terminal; and
controlling the terminal located within the first region to be connected to the network until the terminals that are located within the first region but are not connected to the network are not present.

11. The terminal authentication method according to claim 9,
wherein a plurality of first regions is present, and
wherein in the case where the terminal is located at any one of the first regions, the terminal is controlled to be connected to the network.

12. The terminal authentication method according to claim 9,
wherein the terminal located within the first region is controlled to be connected to a mesh network.

* * * * *